(12) United States Patent
Hayahara et al.

(10) Patent No.: US 8,708,405 B2
(45) Date of Patent: Apr. 29, 2014

(54) VEHICLE SEAT WITH SLIDER RAIL IN BACK FACE OF SEAT BACK

(75) Inventors: Hiroaki Hayahara, Seto (JP); Toshinao Wada, Miyoshi (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 210 days.

(21) Appl. No.: 12/844,125

(22) Filed: Jul. 27, 2010

(65) Prior Publication Data

US 2011/0043027 A1 Feb. 24, 2011

(30) Foreign Application Priority Data

Aug. 20, 2009 (JP) .................................. 2009-191082

(51) Int. Cl.
*B60N 2/64* (2006.01)
*B60N 3/04* (2006.01)
*A47C 7/62* (2006.01)

(52) U.S. Cl.
USPC .................................. 297/188.04; 297/188.05

(58) Field of Classification Search
USPC ............. 297/188.04, 188.05, 188.06, 378.11, 297/378.12, 378.13, 378.14, 483, 484, 297/411.36; 296/65.01, 65.16; 248/419, 248/420, 424, 429
See application file for complete search history.

(56) References Cited

U.S. PATENT DOCUMENTS

| | | | |
|---|---|---|---|
| 6,488,151 B2 * | 12/2002 | Ramsey et al. ............... | 206/378 |
| 6,688,698 B1 * | 2/2004 | Chou et al. ............... | 297/411.36 |
| 7,044,550 B2 * | 5/2006 | Kim ........................... | 297/283.3 |
| 2005/0067873 A1 * | 3/2005 | Iyoda et al. .............. | 297/378.14 |
| 2005/0236882 A1 | 10/2005 | Kim | |
| 2010/0133407 A1 | 6/2010 | Fujieda et al. | |
| 2012/0181409 A1 * | 7/2012 | Hayahara et al. ............. | 248/429 |

FOREIGN PATENT DOCUMENTS

| | | |
|---|---|---|
| CN | 2639071 | 9/2004 |
| CN | 1689865 | 11/2005 |
| DE | 102004060568 | 11/2005 |
| JP | 58-73316 | 5/1983 |
| JP | 07-37810 | 7/1995 |
| JP | 07-179150 | 7/1995 |
| JP | 2002067761 A * | 3/2002 |

OTHER PUBLICATIONS

U.S. Appl. No. 12/850,039 to Ryoshu Nakane et al., filed Aug. 4, 2010.
China Office action, dated May 24, 2012 along with an English translation thereof.
Germany Office action, dated Jul. 23, 2013 along with an english translation thereof.
Japan Office action, dated Jul. 30, 2013 along with an english translation thereof.

* cited by examiner

*Primary Examiner* — David R Dunn
*Assistant Examiner* — Timothy J Brindley
(74) *Attorney, Agent, or Firm* — Greenblum & Bernstein, P.L.C.

(57) ABSTRACT

A slider rail is provided in the back face of the seat back of a vehicle seat. The vehicle seat is formed of a framework having a plurality of frame members. The slide rail forms a guide path along which a slider is moved. The slide rail is attached outside the framework to a side portion (side frame member) of the seat back and extends in a longitudinal direction of the seat back, and overlaps with the side frame member in a front-rear direction of the vehicle seat.

7 Claims, 8 Drawing Sheets

VEHICLE SEAT WITH SLIDER RAIL IN BACK FACE OF SEAT BACK

INCORPORATION BY REFERENCE

The disclosure of Japanese Patent Application No. 2009-191082 filed on Aug. 20, 2009 including the specification, drawings and abstract is incorporated herein by reference in its entirety.

BACKGROUND OF THE INVENTION

1. Field of the Invention

The invention relates to a vehicle seat. More specifically, the invention relates to a vehicle seat that includes a long slide rail provided in the back face of a seat back, wherein the slide rail having a guide path along which a slider is moved.

2. Description of the Related Art

Conventionally a slide rail (deck rail) is provided in the back face of the seat back of a vehicle seat that is arranged with its back facing a trunk space located at the rear of a vehicle. The slide rail allows a slider having hook fittings, such as a hook, to be slidably engaged. Here, Japanese Utility Model Application Publication No. 7-37810 (JP-U-7-37810) describes an example configuration in which a slide rail (deck rail) is arranged on the back face of a seat back so that the slide rail extends in the longitudinal direction of the seat back.

However, in the above described existing art, the slide rail is added onto the back face and protrudes beyond the back face of the seat back. The protrusion may reduce the trunk space or form the back face of the seat back into a stepped shape.

SUMMARY OF THE INVENTION

The invention allows a slide rail to be provided in the back face of a seat back in a manner so that the slide rail does not protrude beyond the back face.

A first aspect of the invention provides a vehicle seat. The vehicle seat includes a slider, a slide rail provided in a back face of a seat back, wherein the slide rail has a guide path along which a slider is moved, and a framework of the vehicle seat that has a plurality of frame members. The slide rail is attached outside the framework to one side frame member and extends in a longitudinal direction of the seat back, and overlaps with the side frame member in a front-rear direction of the vehicle seat.

With the above aspect, the slide rail is attached outside the framework to the side frame member and overlaps with the side frame member in the front-rear direction of the vehicle seat. Thus, the slide rail may be attached so as not to project from the back face of the seat back.

In the above first aspect, the framework of the side portion of the seat back, located at a side where the slide rail is attached, may have an upper region and a lower region, the slide rail may be located outside and adjacent to the upper region, the lower region may be located below the upper region, and the framework may be formed so that the upper region is located inside the lower region.

With the above aspect, the side frame member where the slide rail is attached, is formed so that the upper region adjacent to the slide rail is located inside the lower region. Thus, it is possible to arrange the slide rail without increasing the width of the seat back.

In the above first aspect, the vehicle seat may further include a cover member that covers a surface of the slide rail, the cover member may extend around and cover a corner formed by the back face and a side face of the seat back.

With the above aspect, the cover member extends around and covers a corner formed by the back face and a side face of the seat back. Thus, even when the slide rail is attached in proximity to an edge of the side portion of the seat back, a slight gap formed between the slide rail and the edge portion of the seat back may be covered with the cover member, and the corner of the side portion of the seat back may be rounded by the cover member. Thus, it is possible to form the outer surface of the corner of side portion of the seat back with a good appearance.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, an embodiment of the invention will be described with reference to the accompanying drawings.

Figure 1:
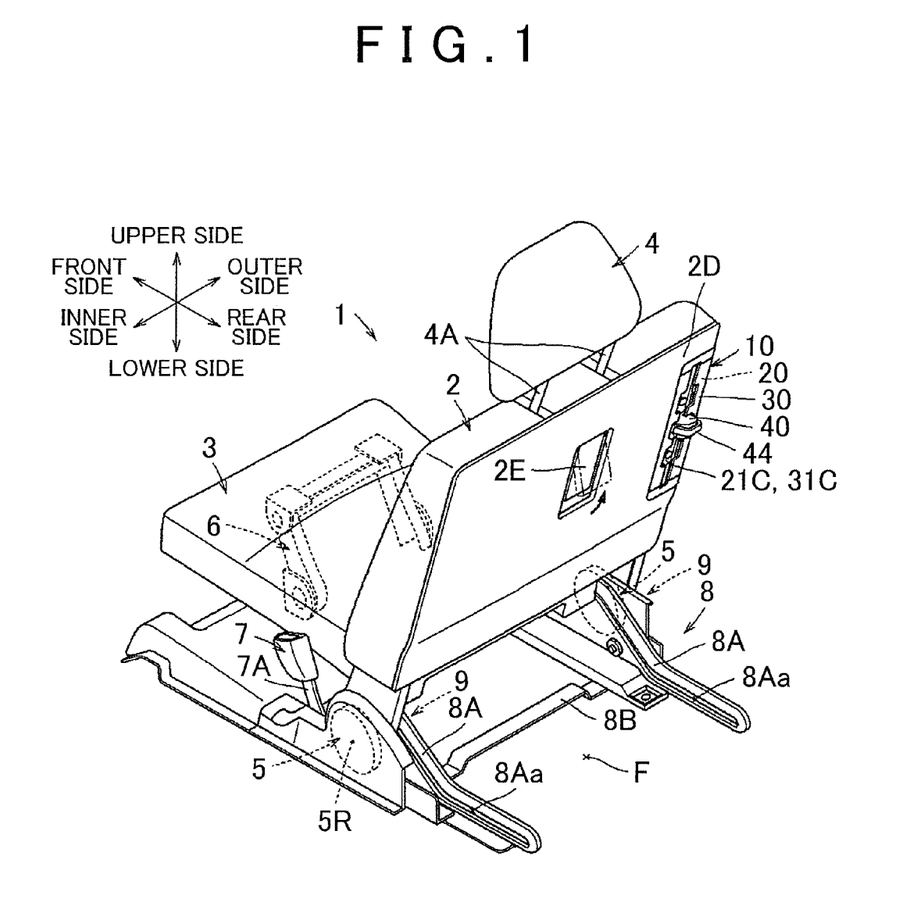
FIG. 1 is a perspective view that shows the normal seating position of a vehicle seat according to a first embodiment as viewed from the rear.
Figure 2:
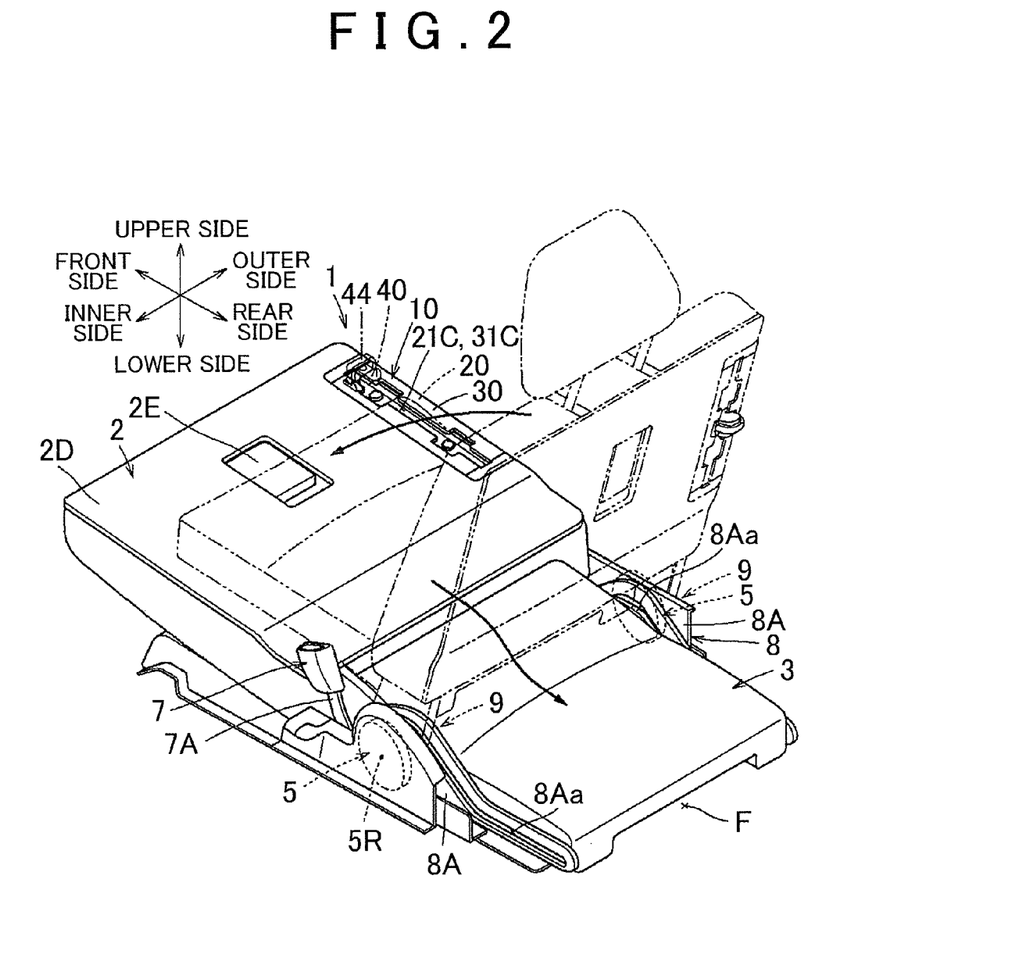
FIG. 2 is a perspective view that shows the collapsed position of the vehicle seat.

The configuration of a vehicle seat 1 according to a first embodiment will be described with reference to FIG. 1 through FIG. 8. Here, FIG. 1 shows the configuration of the vehicle seat 1 according to the present embodiment. The vehicle seat 1 may be provided in the rearmost row in a vehicle equipped with three seat rows. The vehicle seat 1 includes a seat back 2, a seat cushion 3 and a headrest 4. The seat back 2 serves as a backrest for a seated occupant. The seat cushion 3 serves as a seating portion. The headrest 4 supports the head of a seated occupant.

More specifically, the vehicle seat 1 may be one of two seats provided in the third seat row, and is arranged at the right side when viewed from the rear side of the vehicle. Then, a side rim that constitutes a vehicle body side wall (not shown) is attached next to an outer side portion of the seat on the right side in the drawing, and the other seat of the third seat row is arranged next to an inner side portion of the seat on the left side in the drawing.

Furthermore, in the vehicle seat 1, the seat back 2 and the seat cushion 3 each are coupled to and supported by a base frame 8 that is fixed to the floor F of the vehicle, and the headrest 4 is coupled to and supported by the upper portion of the seat back 2. More specifically, the lower ends of the right and left sides of the seat back 2 are coupled to the base frame 8 via a disk-shaped reclining device 5. Each disc-shaped reclining device 5 functions as a rotary shaft device that locks and releases rotation of the shaft.

Figure 3:
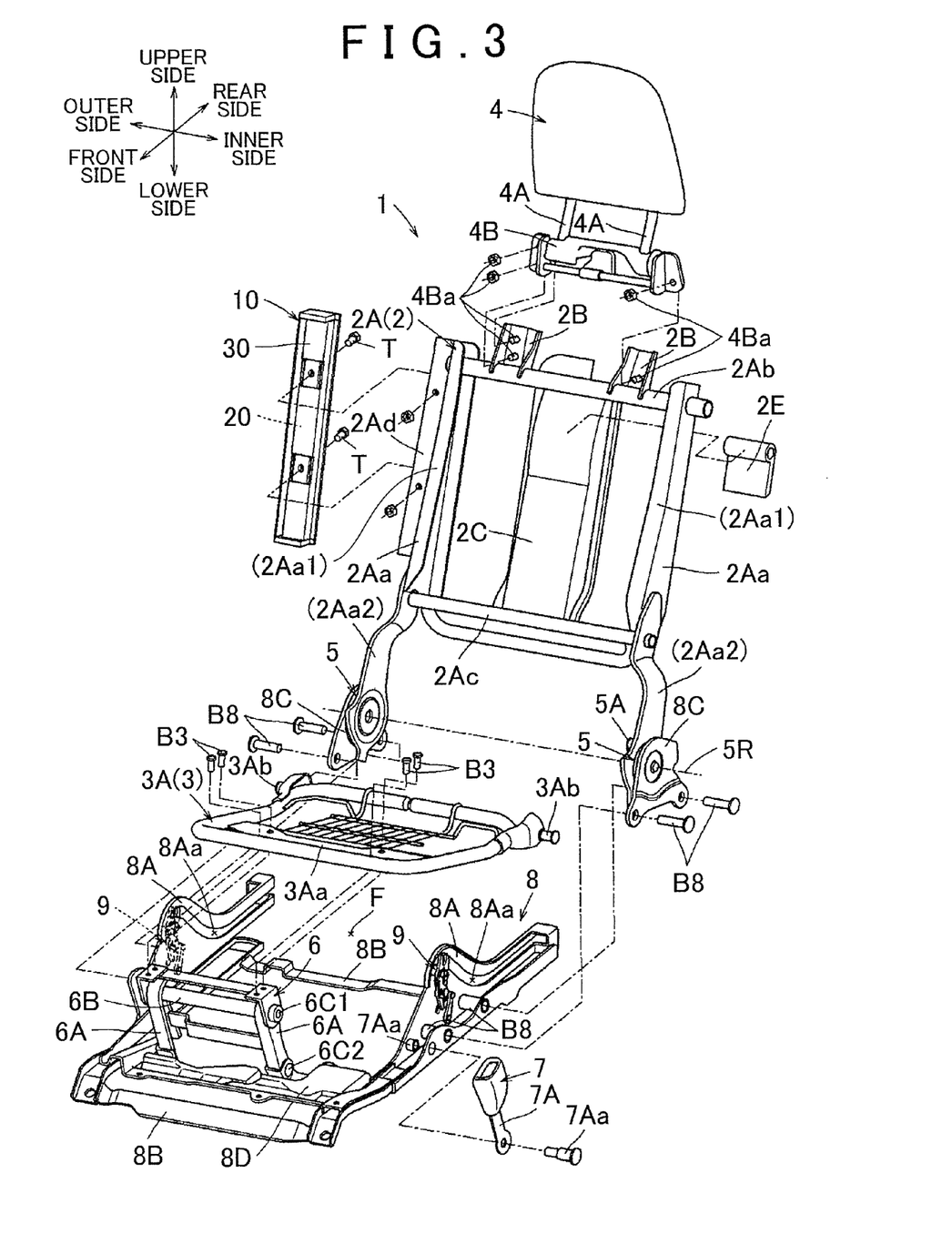
FIG. 3 is an exploded perspective view that shows the framework structure inside the vehicle seat.
Figure 4:
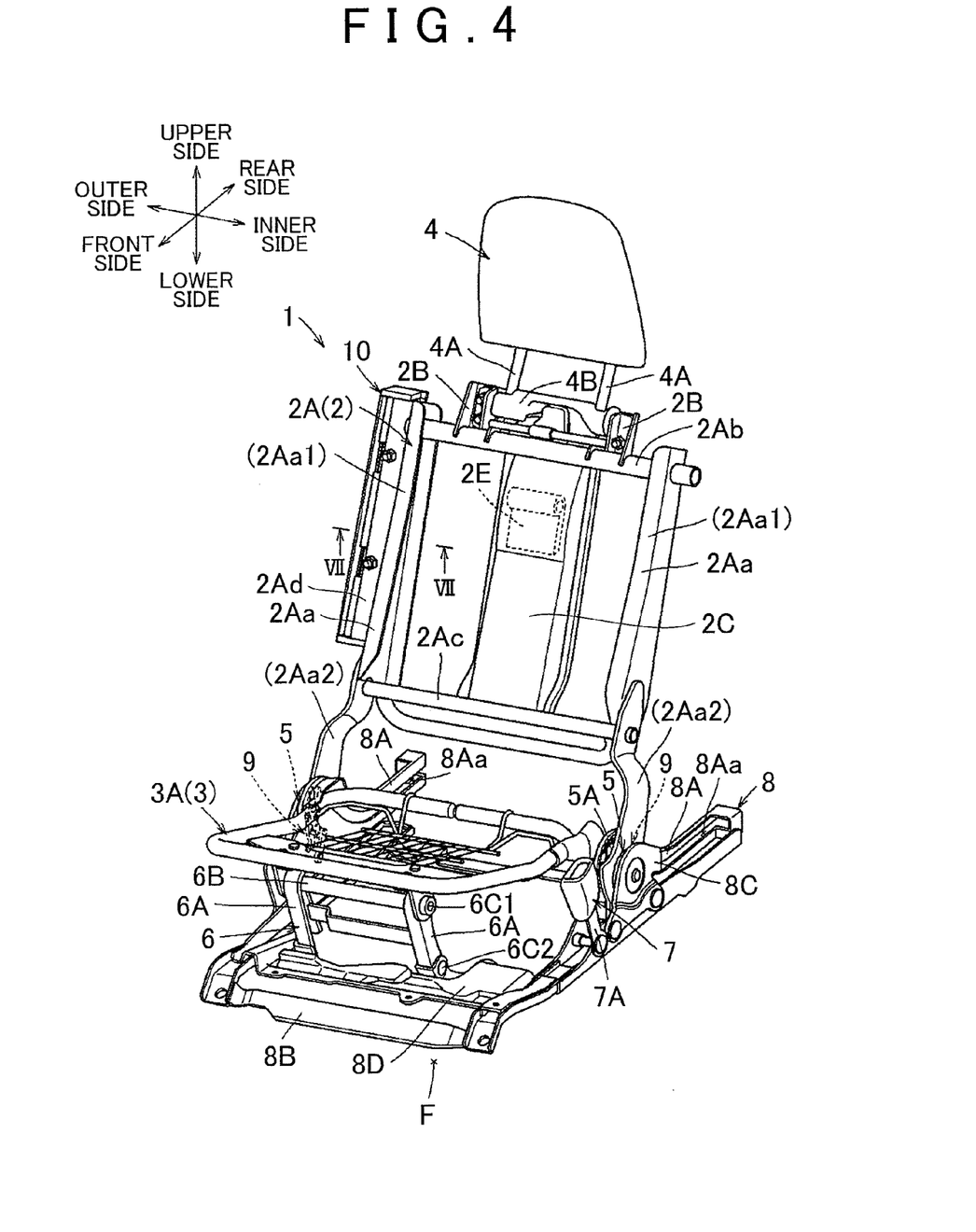
FIG. 4 is a perspective view that shows the assembled framework structure shown in FIG. 3.

Here, as shown in FIG. 3 and FIG. 4, the base frame 8 is formed from right and left base plates 8A that extend in the longitudinal direction of the vehicle. Each base plate 8A is fastened to the floor F using fasteners, such as bolts and nuts (not shown). Moreover, the respective front portions of the pair of base plates 8A are integrally coupled to each other by a narrow horizontally long tie plate 8B, and the respective rear portions of the pair of base plates 8A are integrally coupled to each other by another tie plate 8B. Note that each tie plate 8B is also fastened to the floor F by using bolts and nuts (not shown).

A back frame 2A forms the framework of the seat back 2. The back frame 2A includes right and left side frame members 2Aa, an upper pipe 2Ab and a lower pipe 2Ac, which are assembled into a rectangular shape. The frame members 2Aa may be made from a steel plate and each extends in the longitudinal direction of the seat back 2. The upper pipe 2Ab is made of a steel pipe that is integrally coupled to the upper end of each side frame members 2Aa. The lower pipe 2Ac is also made of a steel pipe and that is integrally coupled to the lower end of each side frame members 2Aa. Then, the lower ends of the right and left side frame members 2Aa are respectively coupled to the right and left base plates 8A via the reclining devices 5.

More specifically, the side frame members 2Aa of the seat back 2 are respectively coupled to brackets 8C, which are fixed to the corresponding base plates 8A of the base frame 8. Each bracket 8C is fastened to a corresponding base plate 8A by fasteners B8, such as. In addition, a support plate 7A of a seat belt buckle 7 is fastened to the inner base plate 8A, shown on the right side in the drawing, by a fastener 7Aa. The seat belt buckle 7 serves as a belt buckling portion of a seat belt device (not shown).

In addition, in the headrest 4, a hinge bracket 4B that has a hinge is integrally coupled to the lower end portions of two columnar stays 4A that serve as support columns, and the hinge bracket 4B is fastened to brackets 2B that are coupled to the upper pipe 2Ab of the back frame 2A by fasteners 4Ba. Thus, the headrest 4 is coupled to the upper portion of the seat back 2.

The rotation at the hinge of the hinge bracket 4B is normally locked, so the headrest 4 is held at a position where the body that supports the head of an occupant protrudes upward from the seat back 2. However, the hinge bracket 4B may be released to rotate by pulling up an operating lever 2E provided in the back face of the seat back 2, and the body of the headrest 4 is tilted forward around a hinge shaft (not shown) of the hinge bracket 4B together with the stays 4A. Thus, the headrest 4 folds toward the front face of the seat back 2 (see FIG. 2).

A mechanism for releasing the hinge bracket 4B through operation of the operating lever 2E shown in FIG. 3 and FIG. 4 is fixed to a steel plate center bracket 2C that spans between the upper pipe 2Ab and lower pipe 2Ac of the back frame 2A; however, the mechanism is not shown in the drawing. In addition, the operating lever 2E is connected to the back face of the center bracket 2C by a hinge member.

The inner reclining device 5 shown on the right side of the drawing has a rotation stop function, and the outer reclining device 5 has no rotation stop function. The inner reclining device 5 is normally held in a rotation-stopped state. As shown in FIG. 1, if the operating lever 2E provided at the back face of the seat back 2a is pulled up, a release lever 5A, coupled to the inner reclining device 5, is operated to thereby release the rotation-stopped state of the inner reclining device 5.

A mechanism that operating lever 2E releases the release lever 5A of the inner reclining device 5 is formed of a cable pulling structure; however, the cable pulling structure is not shown in the drawing in the present embodiment. Thus, with the above configuration, the seat back 2 is normally locked by the inner reclining device 5 in an upright position that allows a seated occupant to use the seat back 2 as a backrest. In addition, when the operating lever 2E is pulled up to release the rotation-stopped state of the seat back 2, the seat back 2 is shifted into a state where the seat back 2 may be tilted forward around a rotation center 5R at a coaxial line set for both reclining devices 5.

Here, an urging spring (not shown) is hooked between the seat back 2 and the base frame 8. The urging spring normally urges the seat back 2 to tilt forward. By so doing, the rotation-stopped state of the seat back 2 may be released by pulling up the operating lever 2E to thereby fold the seat back 2 forward by the urging force of the urging spring (not shown) to a position at which the seat back 2 is parallel to the floor F (see FIG. 2).

Next, referring back to FIG. 3 and FIG. 4, the configuration of the seat cushion 3 will be described. A cushion frame 3A forms the framework of the seat cushion 3. The cushion frame 3A is formed of steel pipes assembled into a rectangular shape. Then, in the seat cushion 3, both side portions of the front end of the cushion frame 3A are rotatably linked to the base frame 8 via a front link 6.

Here, the front link 6 is formed so that right and left long plate-like link members 6A are coupled to each other by a rod 6B. Then, hinge portions 6C1, formed at the upper end portions of each link member 6A, are respectively fastened to fitting portions 3Aa formed at the front end of the cushion frame 3A by fasteners B3 formed of bolts and nuts. Thus, the front link 6 is coupled to the cushion frame 3A so as to be rotatable around the hinge portions 6C1.

In addition, hinge portions 6C2 are formed at the lower end of each link member 6A, and each hinge portions 6C2 are fastened to a support bracket 8D by bolts and nuts (not shown). The support bracket 8D spans between the two base plates 8A of the base frame 8. Thus, the front link 6 is rotatably coupled to the base frame 8 around the hinge portions 6C2.

The support bracket 8D may be formed of a horizontally long plate member, and the right and left ends of the support bracket 8D are fixed to the corresponding base plates 8A. Note that the support bracket 8D itself is also fastened to the floor F by bolts and nuts (not shown). Slide pins 3Ab are respectively provided at both side portions of the rear end of the cushion frame 3A of the seat cushion 3. The slide pins 3Ab protrude toward opposite outer sides of the cushion frame 3A.

The slide pins 3Ab are inserted through respective rail holes 8Aa. The rail holes 8Aa are extend in the front-rear direction of the vehicle seat 1, and are formed in each base plates 8A. The slide pins 3Ab are fitted to the corresponding base plates 8A so as to be slidable in the front-rear direction along the shapes of the rail holes 8Aa. The slide pins 3Ab slide forward within the respective rail holes 8Aa when the front link 6 is tilted forward around the lower end hinge portions 6C2, and slide rearward when the front link 6 is tilted backward.

Forward rotation of the front link 6 is stopped at a position at which the slide pins 3Ab come into contact with the front end portions of the rail holes 8Aa to be locked. At the rotation-stopped position, the seat cushion 3 is maintained in a normal seating position, in which the seat cushion 3 is used for seating during normal times. More specifically, in order to maintain the seat cushion 3 in the normal seating position, cushion lock devices 9 lock each slide pin 3Ab in position.

The cushion lock devices 9 are pressed as the corresponding slide pins 3Ab move to forward in the rail holes 8Aa to actuate a lock, and remain locked at the front ends of the corresponding rail holes 8Aa. Then, when the operating lever 2E provided at the back face of the seat back 2 is pulled up, the cushion lock devices 9 are released whereby the slide pins 3Ab are also released.

Each slide pin 3Ab is then free to slide rearward in the corresponding rail hole 8Aa when the front link 6 is tilted rearward. Here, the front end of each rail hole 8Aa is located higher in the height direction of the vehicle than that of the rear end of each rail hole 8Aa. Each rail hole 8Aa may be formed to incline downward from the front end toward the rear end.

Thus, the seat cushion 3 is configured to smoothly move rearward as the slide pins 3Ab smoothly slide rearward on the inclined surfaces of the corresponding rail holes 8Aa when the front link 6 is tilted rearward. In addition, an urging spring (not shown) is hooked between the seat cushion 3 and the base frame 8. The urging spring normally urges the seat cushion 3 rearward.

When the locked slide pins 3Ab are released by pulling up the operating lever 2E as described above, the seat cushion 3 is moved toward the rear of the vehicle by the urging force of the urging spring (not shown). Then, the seat back 2 is tilted into the area where the seat cushion 3 was before being moved rearward, the seat back 2 and the seat cushion 3 are shifted into a retracted position in which the seat back 2 and the seat cushion 3 are arranged in line in the vehicle longitudinal direction, whereby the seat back 2 is laid flush with the seat cushion 3 on the floor F.

Here, the entire back face of the seat back 2 is covered with a hard flat backboard 2D. Accordingly, if the seat back 2 is tilted forward into the retracted position, the back face of the seat back 2 may be used as a mounting surface of a baggage rack, or the like. Furthermore, referring back to FIG. 1, a vehicle slide rail device 10 is installed at the back face of the seat back 2 along the outer edge portion of the back face. The vehicle slide rail device 10 extends in the seat back 2 in the longitudinal direction of the seat back 2.

Figure 5:
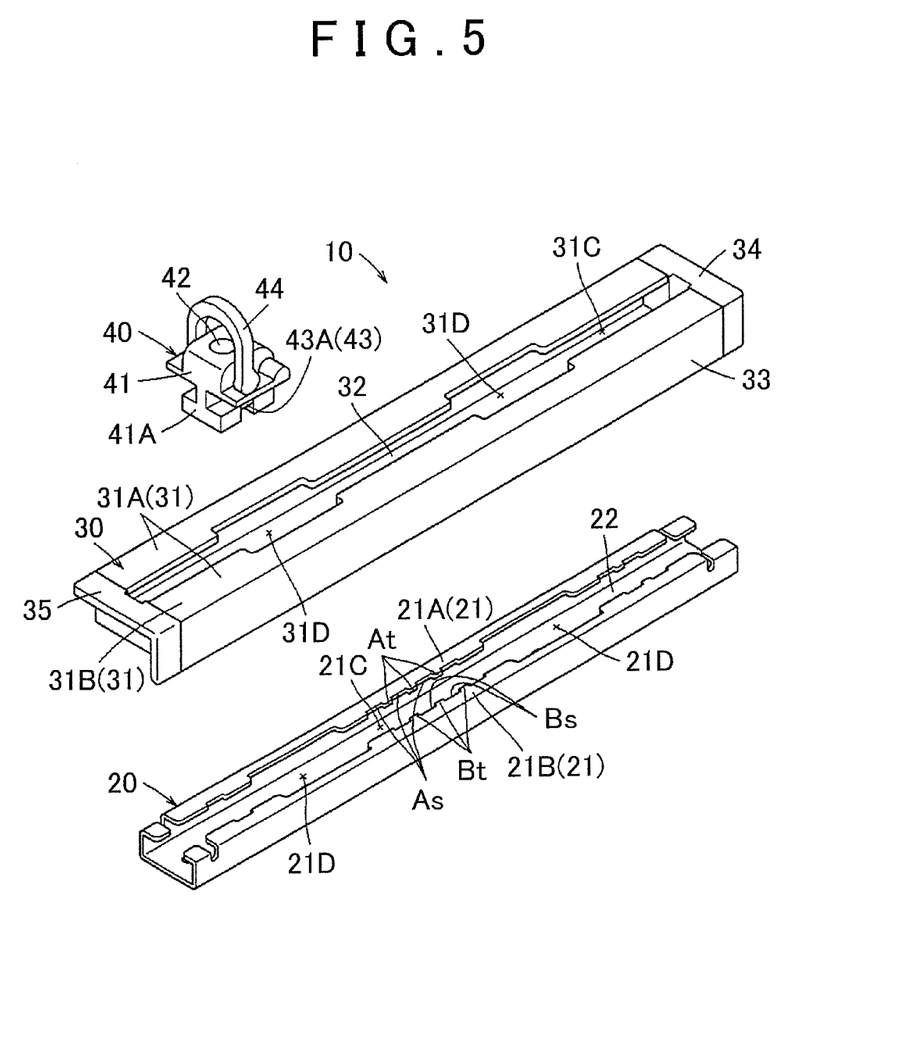
FIG. 5 is an exploded perspective view of a vehicle slide rail device.

As shown in FIG. 5, the vehicle slide rail device 10 includes a long slide rail 20 and a cover member 30 that covers the surface of the slide rail 20. A slider 40, which includes a hook 44, may be slidably fitted to the slide rail 20. When the slider 40 is locked at an appropriate slide position to fix the position of the hook 44, the hook 44 may be used as a hook fitting for baggage placed in the trunk space behind the vehicle seat 1. Next, the configurations of the slide rail 20, cover member 30 and slider 40 will be described in detail.

First, the configuration of the slide rail 20 will be described. That is, as shown in FIG. 5, the slide rail 20 is formed so that a long steel plate is formed into a rectangular shape in a cross section perpendicular to the longitudinal direction of the steel plate. Then, a gap is formed at the center of one side of the rectangular frame between one bent end and the other bent end of the steel plate to form a lengthwise slit 21C. The slit 21C exposes part of the slider 40, fitted in the slide rail 20.

Accordingly, the slide rail 20 has a top plate portion 21 having the lengthwise slit 21C that extends straight in the longitudinal direction in the center of one face of the rectangular frame, at which the one bent end and the other bent end of the steel plate face each other. Then, as shown in FIG. 1, the slide rail 20 is embedded in the seat back 2 so that the slide rail 20 does not protrude from the back face of the seat back 2, and then the slide rail 20 is attached so that the opening slit 21C is exposed from the back face of the seat back 2.

Figure 8:
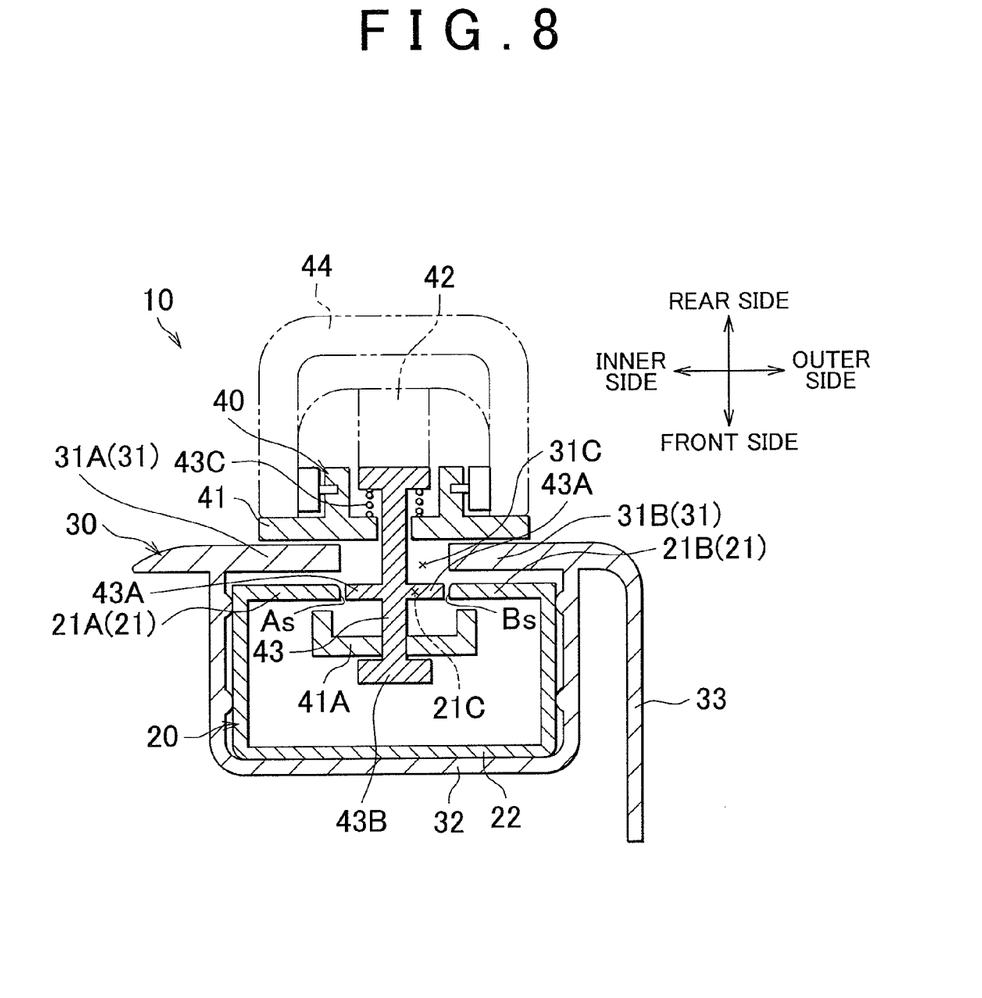
FIG. 8 is a partial cross-sectional view that shows an engagement and locking structure by which a slider is lockingly engaged with a slide rail.

Referring back to FIG. 5, the top plate portion 21 of the slide rail 20 is formed of a pair of engaging pieces 21A and 21B disposed to either side of the opening slit 21C. The inward-directed edge portions of the engaging pieces 21A and 21B respectively have engaging teeth At and Bt. The engaging teeth At and Bt are shaped so that projections and recesses directed toward the opening slit 21C are repeated in the longitudinal direction. As shown in FIG. 8, lock pawls 43A press against the top plate portion 21 from the inside of the slide rail 20 by the urging force (as described later), and then respectively enter any tooth groove As between the engaging teeth At and any tooth groove Bs between the engaging teeth Bt. Thus, the engaging teeth At and Bt hold the slider 40 and prevent the slider from sliding. The lock pawls 43A are components of the slider 40.

In addition, as shown in FIG. 5, two rectangular openings 21D are formed in the top plate portion at different positions in the longitudinal direction of the top plate portion 21. Each opening 21D serves as an insertion port for inserting the slider 40 into the slide rail 20 or detaching the slider 40 from the slide rail 20. These openings 21D are formed in a shape such that the inward-directed edge portions of the engaging pieces 21A and 21B are partially cut away to thereby partially widen the slit 21C.

Figure 7:
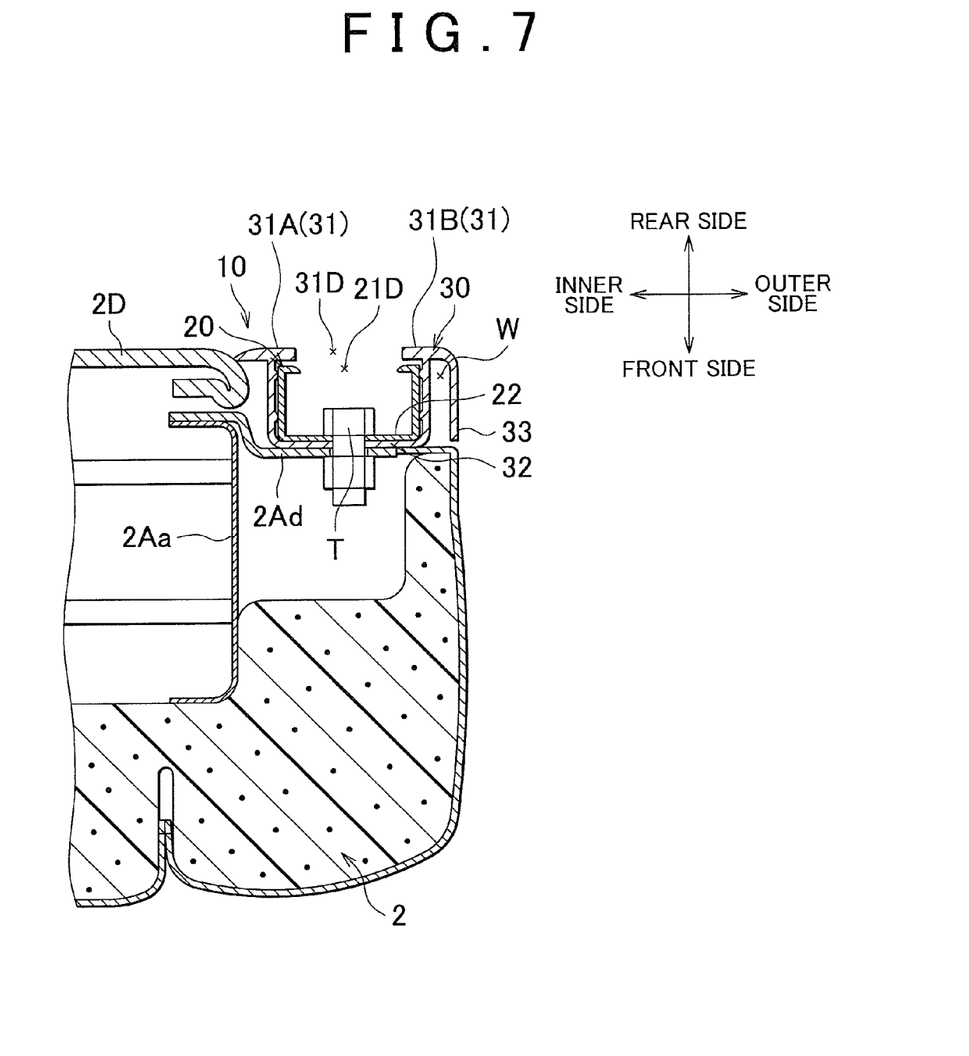
FIG. 7 is a cross-sectional view that is taken along the line VII-VII in FIG. 4.

Next, referring back to FIG. 5, the configuration of the cover member 30 will be described. The cover member 30 is formed from an extruded aluminum alloy that is a long rail shape. As shown in FIG. 7, the cross section of the cover member 30 has a rectangular shape that is large enough to surround the entire outer peripheral portion of the slide rail 20. The cover member 30 has a top plate portion 31 that overlaps the top plate portion 21 of the slide rail 20. The opening slit 31C is formed in the top plate portion 31 over the entire length in the longitudinal direction so as to expose the opening slit 21C of the top plate portion 21 of the slide rail 20 outside.

Furthermore, the top plate portion 31 of the cover member 30 has rectangular openings 31D. The rectangular openings 31D expose the corresponding openings 21D of the top plate portion 21 of the slide rail 20 outside. These openings 31D are formed in such a manner that the inward-directed edge portions of respective top plate pieces 31A and 31B that are disposed on both sides of the opening slit 31C are subjected to cutting.

Figure 6:
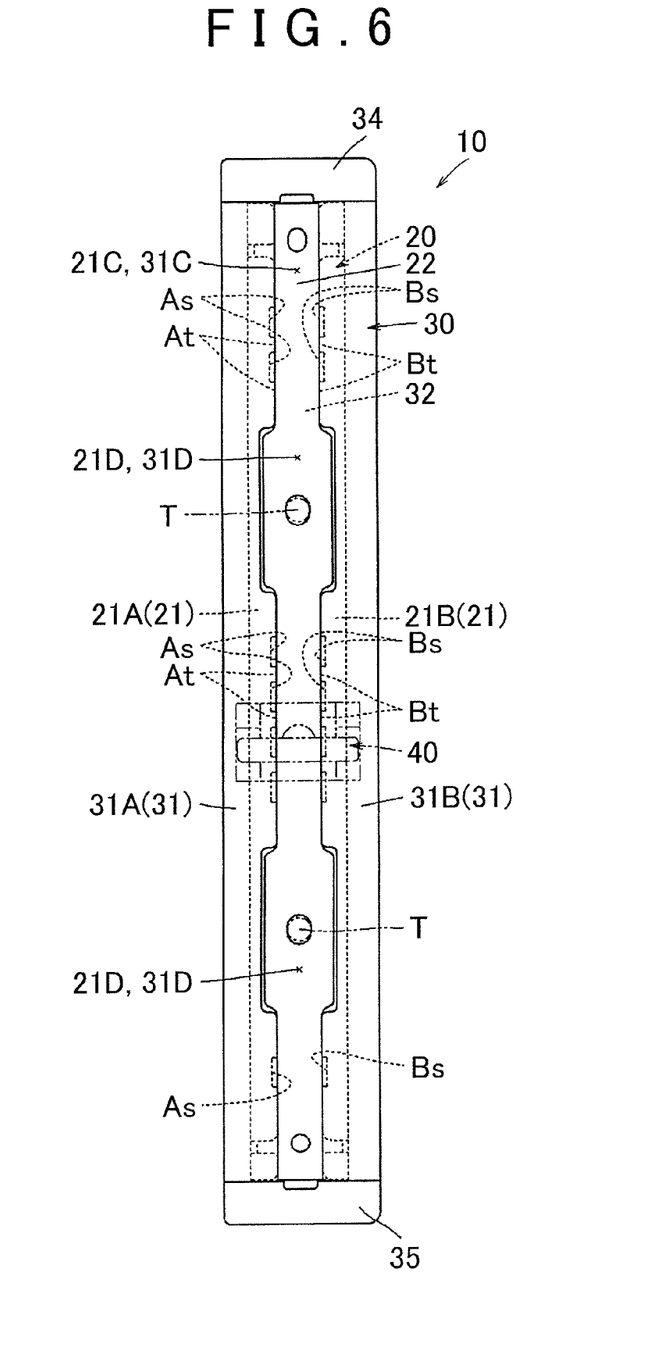
FIG. 6 is a plan view that shows the assembled vehicle slide rail device.

As shown in FIG. 7, the slide rail 20 and the cover member 30 are fixed to the outer side frame member 2Aa of the seat back 2 so that the respective overlapping bottom plate portions 22 and 32 are fastened by fastening bolts T to a plate-like fitting bracket 2Ad that is connected to the outer side frame member 2Aa. More specifically, as shown in FIG. 6, the fastening bolts T are fastened to the bottom plate portions 22 and 32 at positions that are exposed through openings at which the openings 21D of the slide rail 20 overlap with the openings 31D of the cover member 30.

The fastening bolts T may be easily fastened by, for example, inserting the fastening bolts T through the openings and then inserting a fastening tool through the opening windows. In addition, referring back to FIG. 3, the lower portions of each side frame member 2Aa is bent outward in a crank shape, so that the each upper region 2Aa1 is located inside the respective lower region 2Aa2.

Then, the slide rail 20 and the cover member 30 are attached outside and adjacent to the inward-bent upper region 2Aa1 of the outer side frame member 2Aa, and are fastened to the fitting bracket 2Ad that projects outside from the upper region 2Aa1. Thus, as shown in FIG. 7, the slide rail 20 and the cover member 30 are embedded in the seat back 2 at the outer side portion of the seat back 2 so as not to project from the back face of the seat back 2, and the slide rail 20 and the cover member 30 overlap with the seat back 2 with respect to the front-rear direction of the vehicle seat 1. In other words, in side view of the vehicle seat 1, the front surface of the slide rail 20 or cover member 30 is located forward of the rear surface of the upper region 2Aa1 of the side frame member 2Aa.

More specifically, the top plate portion 31 of the cover member 30 covers the top plate portion 21 of the slide rail 20, and is substantially flush with the back face of the seat back 2. A fin 33 extends from the outer edge of the top plate portion 31 toward the front side of the seat back 2. The fin 33 covers the outer corner, formed by the back face and the side face, of the seat back 2.

By so doing, the cover member 30 extends around and covers the corner, formed by the back face and the side face of the outer side portion of the seat back 2. Here, referring back to FIG. 5, caps 34 and 35 are attached to each longitudinal end of the cover member 30. The caps 34 and 35 prevent the slider 40 from falling off. The caps 34 and 35 are also respectively fitted to each longitudinal end of the slide rail 20.

Next, the configuration of the slider 40 will be described with reference to FIG. 5 and FIG. 8. The slider 40 includes a body portion 41, a push button 42, a locking member 43 and the hook 44. The body portion 41 engages the top plate portion 21 of the slide rail 20. The push button 42 is provided in the body portion 41. The locking member 43 is pressed by the push button 42. The hook 44 is rotatably attached to the body portion 41. A bottom plate portion 41A is formed at the bottom portion of the body portion 41. The bottom plate portion 41A may be inserted through any one of the openings 21D of the slide rail 20 into the rail frame, and then the body portion 41 is slid in the longitudinal direction of the slide rail 20. Accordingly, the slider 40 may slide inside the slit 21C with respect to the top plate portion in a state where the slider 40 is prevented from falling out of the slit 21C, because the bottom plate portion 41A is pressed against the inner surfaces of both engaging pieces 21A and 21B, the slider 40 is prevented from falling out of the slit 21C.

In addition, the push button 42 is provided in a surface of the body portion 41 that is exposed outside of the slide rail 20. When the push button 42 is depressed toward the interior of the slide rail 20, the locking member 43 is pressed down, thereby disengaging the locking member 43 from the top plate portion 21 of the slide rail 20. In addition, the locking member 43 is provided with the push button 42, and is normally urged by the compression spring 43C in a direction to cause the lock pawls 43A to enter the tooth grooves As between the engaging teeth At of the top plate portion 21 and the tooth grooves Bs between the engaging teeth Bt of the top plate portion 21. The compression spring 43C is hooked between the body portion 41 and the locking member 43. The lock pawls 43A are provided inside the rail frame of the slide rail 20.

Thus, when the lock pawls 43A coincide with any tooth groove As between the engaging teeth At and any tooth groove Bs between the engaging teeth Bt of the slide rail 20 as the slider 40 slides, the lock pawls 43A are urged to enter the tooth grooves As and Bs. In this way, the slider 40 is locked in position. Note that plate-like stopper 43B contacts the bottom plate portion 41A of the body portion 41 to thereby stop the displacement of the locking member 43 caused by the compression spring 43C. The stopper 43B is formed at the bottom portion of the locking member 43. The slide lock state of the slider 40 is released when the push button 42 is depressed to press down the movable portion 43 to disengage the lock pawls 43A from the tooth grooves As and Bs.

In this way, the slide rail 20 is attached outside the framework (outer side frame member 2Aa) of the side portion of the seat back 2 so as to overlap with the side frame member 2Aa in the front-rear direction of the vehicle seat 1. Thus, the slide rail 20 may be attached so as not to project from the back face of the seat back 2. In addition, the outer side frame member 2Aa, to which the slide rail 20 is attached, is formed in a crank shape such that the upper region 2Aa1, to which the slide rail 20 is attached, is located inside the lower region 2Aa2. Thus, the slide rail 20 may be arranged without increasing the width of the seat back 2. Note that, as long as the outer side frame member 2Aa is formed so that the upper region 2Aa1 is located inside the lower region 2Aa2, the shape of the outer side frame member 2Aa is not restricted to a crank shape.

In addition, the cover member 30 extends around and covers the corner, formed by the back face and the side face, of the outer side portion of the seat back 2. Thus, even if the slide rail 20 is arranged at a position near the edge of the seat back 2, the slight space W formed between the slide rail 20 and the edge of the seat back 2 may be covered by the cover member 30, and the corner of the side portion of the seat back 2 may be formed in a rounded shape by the cover member 30. Thus, it is possible to form the outer surface of the corner of the side portion of the seat back 2 with a good appearance.

The aspect of the invention is described using one embodiment; however, the aspect of the invention may be modified into various forms other than the above described embodiment. For example, in the above embodiment, the cover member 30 is provided to cover the surface of the slide rail 20; however, the cover member 30 may be omitted and the top plate portion 21 of the slide rail 20 may remain exposed on the back face of the seat back 2 so as to be flush with the back face. In addition, it is only necessary that the slide rail 20 not project from the back face of the seat back 2. Accordingly, the slide rail 20 may be embedded into the back face of the seat back 2.

Further, in the above embodiment, the top plate portion 31 of the cover member 30 is substantially flush with the back face of the seat back 2; alternatively, the top plate portion 31 may be embedded into the back face of the seat back 2.

What is claimed is:
1. A vehicle seat, comprising:
a slider;
a slide rail provided in a back face of a seat back, wherein the slide rail includes a guide path along which the slider is moved; and
a framework of the vehicle seat that has a plurality of frame members, wherein the slide rail is directly attached outside the framework to one side frame member along its length and extends in a longitudinal direction of the seat back, and overlaps with the side frame member in a front-rear direction of the vehicle seat, wherein
the slide rail is formed by a plate and has a first top plate portion having a pair of engaging pieces disposed to each side of a slit in a center of only the first top plate portion, wherein one bent end and another bent end of the plate face each other,
wherein the first top plate portion of the slide rail is exposed on the back face of the seat back, and the first top plate portion is substantially flush with the back face of the seat back.

2. The vehicle seat according to claim 1,
wherein the side frame member, to which the slide rail is attached, has an upper region and a lower region;
the slide rail is located adjacent the upper region, and the side frame member is formed so that the upper region is located inside the lower region.

3. The vehicle seat according to claim 2, wherein the lower region of the side frame member is bent in a crank shape.

4. The vehicle seat according to claim 1, wherein the first top plate portion is embedded into the seat back with respect to the back face of the seat back.

5. The vehicle seat according to claim 1, further comprising:
a cover member that covers a surface of the slide rail, wherein the cover member extends around and covers a corner formed by the back face and a side face of the seat back.

6. The vehicle seat according to claim 5, wherein the cover member has a second top plate portion that overlaps the first top plate portion of the slide rail, and the second top plate portion is substantially flush with the back face of the seat back.

7. The vehicle seat according to claim 5, wherein the cover member has a second top plate portion that overlaps the first top plate portion of the slide rail, and the second top plate portion is embedded into the seat back with respect to the back face of the seat back.

* * * * *